Oct. 30, 1962 J. CZULAK 3,060,575
CHEESE-CURD FUSING MACHINE
Filed Nov. 12, 1959 4 Sheets-Sheet 1

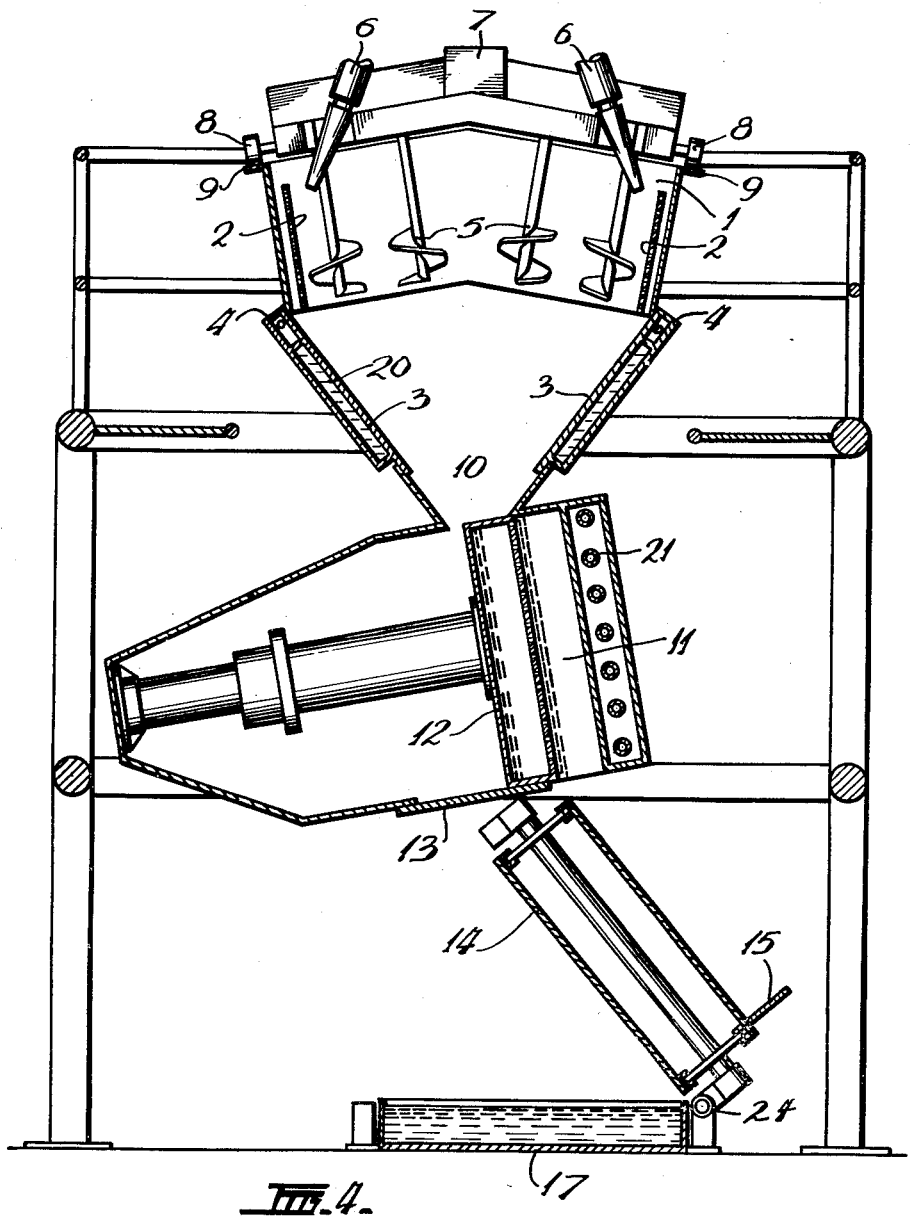

United States Patent Office 3,060,575
Patented Oct. 30, 1962

3,060,575
CHEESE-CURD FUSING MACHINE
Joseph Czulak, Greenslope, Victoria, Australia, assignor to Commonwealth Scientific and Industrial Research Organization, East Melbourne, Victoria, Australia, a body corporate
Filed Nov. 12, 1959, Ser. No. 852,499
Claims priority, application Australia Nov. 12, 1958
7 Claims. (Cl. 31—47)

This invention relates to an improved curd fusing machine and its broad object is to provide a machine which will effect the whole process of fusing the curd simply and efficiently in a semi-continuous operation. More specific objects residing in the provision of various parts of the machine are described hereinafter.

According to this invention there is provided a cheese curd fusing machine having a drainage vat which is provided with at least one perforated wall and with bottom doors and a compression-and-flow chamber situated beneath the vat to receive curd from the vat, said bottom doors being hinged to the vat and adapted to be swung down at an appropriate stage of drainage to serve as a guide for curd passing from the vat to the chamber and said bottom chamber being provided with a perforated compression ram to compress the curd and with a movable wall movable to an open position to allow curd to pass from the chamber.

Preferably the drainage vat is equipped with curd stirrers which rotate and, at the same time, travel from one end of the vat to the other, reversing the direction of both travel and rotation at each end of the vat. The stirring of the curd by this means prevents the lumping together of the curd particles and permits further freeing and separation of the whey. Preferably also, provision is made to attach the delivery pipes for the curd and whey slurry to the carrier of the travelling curd stirrers so that these delivery pipes will also travel from one end of the vat to the other thereby ensuring more even distribution of the curd. The delivery pipes should be so positioned that the slurry of curd and whey is discharged against the perforated wall to ensure rapid drainage and prevent blockage of the perforations by the curd.

Preferably, a slat conveyor, or other slotted conveyor movable forward step-by-step and a co-operating guillotine are provided to receive the curd from the compression-and-flow chamber and to sever it off portion by portion.

Preferably also, the curd passes portion by portion as it is severed, on to a conveyor of slightly convex cross-section which carries the curd to the curd-mill and which by its own convexity causes further fusion and flow of the curd.

Figure 1:
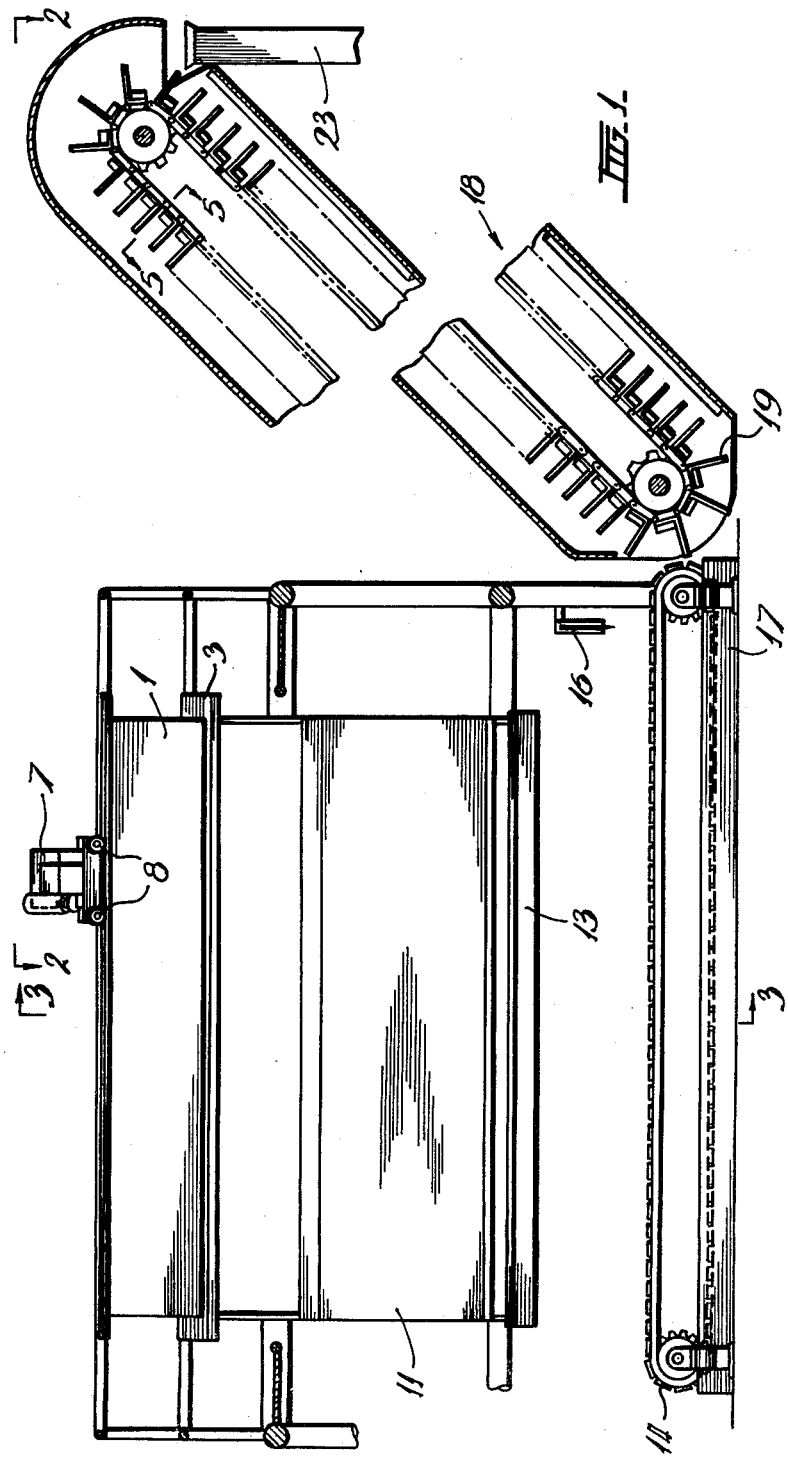
Figure 2:
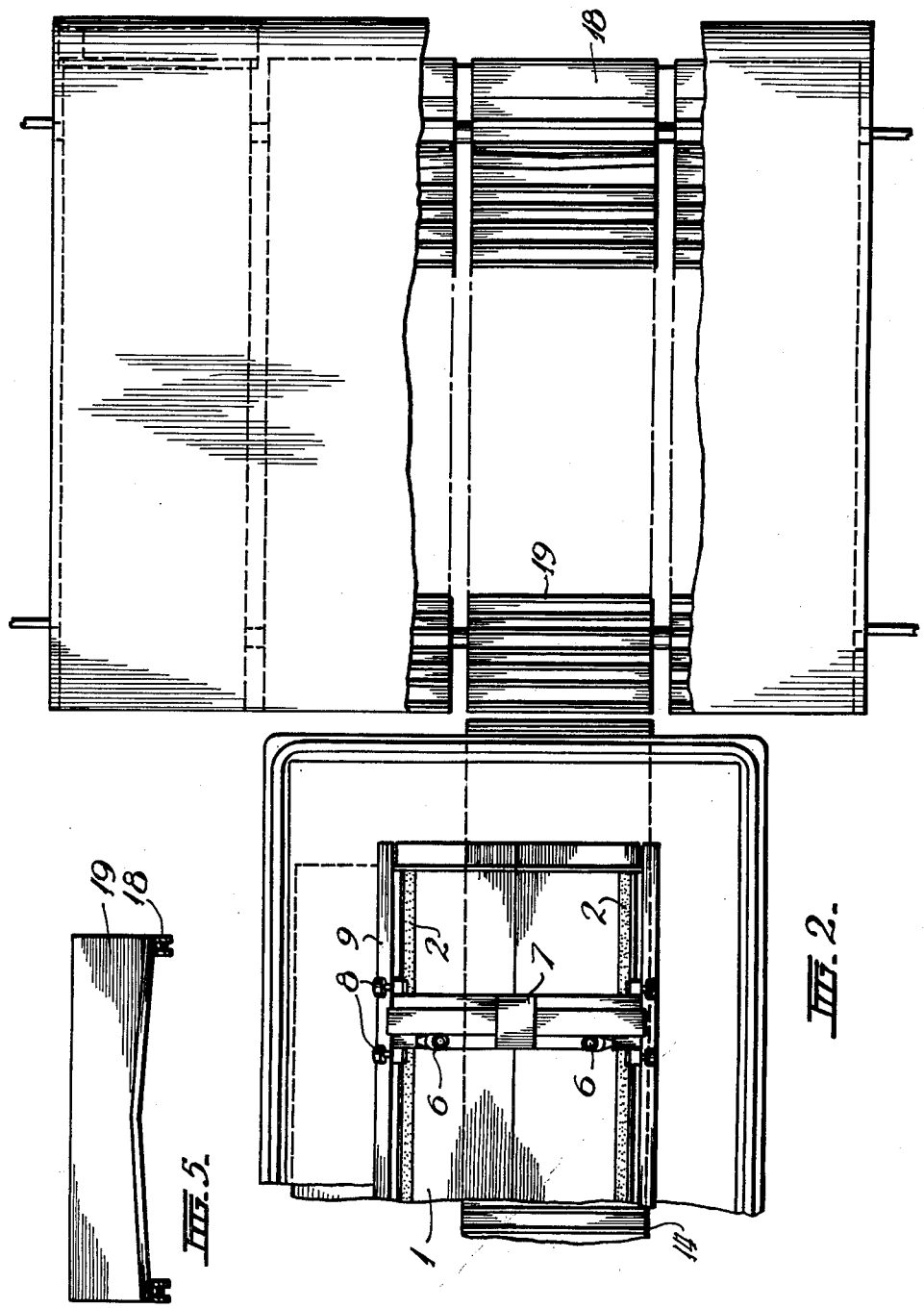
Figure 3:
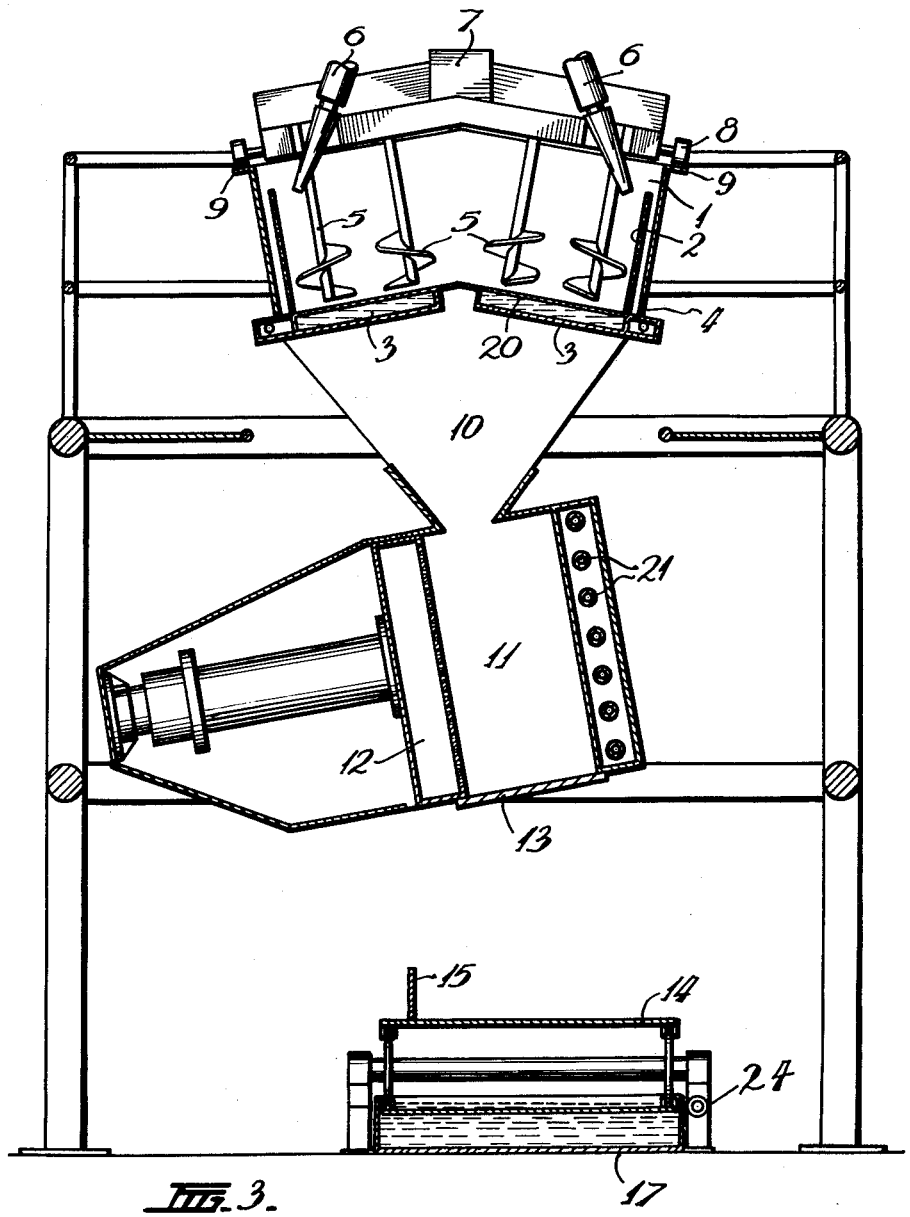

The preferred specific construction of the machine will now be described with reference to the accompanying drawings on which:

FIGURE 1 is a side elevation partly in section of a machine according to the invention, FIGURE 2 is a part plan view on the line 2—2 on FIGURE 1, FIGURE 3 is a cross-sectional view on the line 3—3 in FIGURE 1 showing the parts on the position which they occupy at the beginning of a cycle, FIGURE 4 is a view similar to FIGURE 3 with the parts in the position which they occupy near the end of the cycle, and FIGURE 5 is an enlarged view of part of a conveyor used in the machine.

According to this specific construction, a drainage vat 1 is provided with a pair of opposite false perforated walls 2 and with double walled bottom doors 3 hinged to the outer walls 4. The drainage vat is equipped with travelling curd stirrers 5 and travelling delivery pipes 6. These are carried on a carriage 7 provided with rollers 8 which travel on flanges 9 on the outer walls 4 of the drainage vat. The function of the drainage vat is the separation of curd and whey therein and control of the moisture content of the curd by further stirring of the curd particles after the bulk of the whey has been drained off. Curd and whey delivered by the delivery pipes 6 are sprayed against the false walls 2 and a large proportion of the whey passes through them into the space between the false walls 2 and the outer walls 4. This whey is drained off in any suitable manner.

As shown in FIGURE 4, the hinged bottom doors 3 are adapted to be swung down, at the appropriate stage of the drainage, to form portions of a hopper 10 which is positioned beneath the drainage vat 1, and this hopper delivers the curd into a compression-and-flow chamber 11, one side of which comprises a perforated hydraulic piston 12 and the bottom of which is a slidable plate 13. The piston then moves forward to the position shown in dotted lines in FIGURE 4 and the curd is thus compressed into a fibrous mass by compression of the particles together and by deformation of the fusing mass by causing it to flow upwards. On completion of the compression and deformation the curd is discharged on to a slat conveyor 14 positioned adjacent to the compression-and-flow chamber. This is achieved by movement of the slidable plate 13 to the open position and by slight withdrawal of the hydraulic piston 12 to the position shown in full lines in FIGURE 4.

The slat conveyor 14 is pivoted about one longitudinal edge, as at 24, and when curd is to be discharged from the chamber 11 the conveyor is pivoted to a position as shown in FIGURE 4 and curd is permitted to slide out of the chamber 11 onto the surface of the conveyor. To guide the curd as it passes from the chamber to the conveyor a movable plate 15 is provided on the conveyor and before the curd is passed to the conveyor this plate is in the position shown in FIGURE 3 and as the curd passes on to the conveyor the plate is moved to the position shown in FIGURE 4. When it has received the curd the conveyor is returned to the horizontal position and is moved forward step by step. A guillotine 16 at the end of the conveyor cuts the curd into strips. A whey vat 17 is located beneath the conveyor and excess whey drains from the curd into the vat.

The strips of curd cut by the guillotine 16 are fed to one of a bank of further elevating conveyors 18. These conveyors are provided with compartments formed by plates 19 to receive the strips of curd and as can be seen from FIGURE 5 the bottoms of these compartments are generally convex. From this conveyor the curd may be taken to a curd mill (not shown) by means of the chute 23.

The vat 1 and the chamber 11 may be heated and this may be done by passing hot water, steam or hot gas through the space 20 formed by the double walls of the doors 3 and through the pipes 21 located in the end walls 22 of the chamber 11.

Apparatus according to the invention permits the fusion of cheese curd in an almost continuous process. The amount of curd discharged from the vat 1 to the chamber 11 is regulated so that the chamber is not filled. Thus when the perforated ram moves forward it not only compresses the curd but also causes it to flow upwards thus leading to more intimate fusion as explained in the specification of our Australian Patent No. 211,571.

Curd discharged on to the conveyor 14 tends to flow slightly under its own weight on the conveyor and the cutting of it into strips by the guillotine promotes further drainage of whey from the surfaces of the strips. Further flow takes place when the curd is on the conveyors 18. Due to the convexity of the conveyor the strips of curd are subjected to a bending action similar to that of a simply supported beam and the flow consequent on this leads to further fusion of the curd. In order to permit this flow to take place the curd is allowed to stand on the conveyors 18 and to permit this without slowing up the process the conveyors are arranged in a bank which is movable sideways. Each conveyor in the bank is individually driven and in operation the upper surface of the first conveyor is filled with curd. The conveyors are then moved sideways so that the second conveyor is in position to receive strips of curd and it is operated until its upper surface is filled with curd. The third conveyor is then moved into position and so on until all the conveyors are filled. The bank of conveyors is then returned to its original position with the first conveyor opposite conveyor 14. The first conveyor is caused to run and the curd which was first placed on it is discharged from the upper end while fresh curd is supplied to the lower end.

I claim:

1. A cheese curd fusing machine comprising a drainage vat, perforated side walls in said vat, a bottom wall consisting of downwardly swingable doors extending along the full length of the vat, delivery pipes to convey streams of curd and whey under pressure against the perforated side walls, rotated stirrers to stir the curd within the vat, a traveling carrriage carrying the delivery pipes and stirrers, a compression-and-flow chamber disposed below said bottom wall of the vat, an end wall in the chamber, an inlet at the top of said chamber disposed so that said doors of the vat may be swung downwardly to form a hopper to guide the contents of the vat into the chamber, a compression ram in said chamber and operable between a retracted position in which the said inlet to the chamber is open and an advanced position in which the ram is interposed between said inlet and contents compressed in the chamber, an outlet at the bottom of said chamber through which the compressed contents of the chamber can pass by gravity, a movable plate normally covering said outlet from the chamber, a slat conveyor tiltable between a normal horizontal position and a tilted position in which the surface of the conveyor is in a position to receive the compressed curd from said outlets of the chamber, and a stop member movable across the conveyor to support the lower end of the compressed curd mass as it slides out of the chamber onto the conveyor on withdrawal of the movable plate from said outlet, the said carriage being movable from end to end of the vat to feed the curd and whey evenly along the length of the vat and the direction of rotation of said stirrers being reversed at each end of the vat, an end wall of said chamber and said ram serving to support both sides of the compressed curd as it passes out of said outlet from the chamber onto the conveyor.

2. A cheese curd fusing machine as in claim 1, wherein the slat conveyor moves step by step, and further comprising a guillotine to cut the curd into strips while the curd is fully supported on both sides of the guillotine by the slats of the slat conveyor.

3. A cheese curd fusing machine as in claim 2, further comprising at least one additional conveyor to receive the strips of curd from the slat conveyor, each additional conveyor comprising plates defining separate compartments each of which is adapted to receive and support a separate strip of curd, the bottom of each compartment being upwardly convex to promote further flow under gravity of the curd strip carried thereby.

4. A cheese curd fusing machine as in claim 2, further comprising a bank of individually driven additional conveyors, plates on said additional conveyors to define separate compartments each of which is adapted to receive a separate strip of curd and support the same so that it is subjected to a bending action, the bank of conveyors being movable sideways so that any of said additional conveyors may be positioned to receive strips of curd from the slat conveyor.

5. A cheese curd fusing machine comprising a drainage vat, perforated side walls in said vat, a bottom wall consisting of downwardly swingable doors extending along the full length of the vat, means to feed curd and whey under pressure against the perforated side walls and to distribute the material evenly from one end of the vat to the other, curd stirring means operable to maintain the even distribution of material within the vat, a compression-and-flow chamber disposed below said bottom wall of the vat and having an end wall, an inlet disposed at the top of said chamber so that the doors of the vat may be swung downwardly to form a hopper to guide the contents of the vat into the chamber, a perforated compression ram in said chamber and operable between a retracted position in which said inlet to the chamber is open and an advanced position in which the ram isolates the interior of said chamber between said end wall and ram from said inlet, an outlet at the bottom of the chamber through which the compressed contents of the chamber can pass by gravity, a movable plate normally covering the outlet from the chamber, a slat conveyor tiltable between a normal horizontal position and a tilted position in which the surface of the conveyor is in a position to receive the compressed curd from said outlet of the chamber, a stop member movable across the conveyor to support the lower end of the compressed curd mass as it slides out of the chamber onto the conveyor on withdrawal of the movable plate from the said outlet, a guillotine to cut the curd into strips while the curd is fully supported on both sides of the guillotine by the slats of the slat conveyor, and at least one additional conveyor to receive the strips of curd from the slat conveyor, each additional conveyor comprising plates defining separate compartments each of which is adapted to receive and support a separate strip of curd, the bottom of each compartment being upwardly convex to promote further flow under gravity of the curd strip carried thereby, and said end wall of the chamber and the ram serving to support both sides of the compressed curd as it passes out of the chamber onto the slat conveyor.

6. In a cheese curd fusing machine, a drainage vat comprising perforated side walls, downwardly swingable doors extending along the full length of the vat and constituting the bottom wall thereof, a travelling carriage mounted on the vat and movable from end to end thereof during operation of the machine, delivery pipes mounted on the travelling carriage and arranged to convey streams of curd and whey under pressure against the perforated side walls and rotatable stirrers mounted on the travelling carriage to stir the curd within the vat, the direction of rotation of the stirrers being reversed upon each reversal of the direction of movement of the carriage.

7. In a cheese curd fusing machine, a drainage vat comprising perforated side walls, downwardly swingable doors extending along the full length of the vat and constituting the bottom wall thereof, means to feed curd and whey under pressure against the perforated side walls and to distribute the material evenly from one end of the vat to the other, curd stirring means operable to maintain the even distribution of material within the vat, a compression-and-flow chamber disposed below the bottom wall of the vat and having an end wall, an inlet disposed at the top of the chamber so that the doors of the vat may be swung downwardly to form a hopper to guide the contents of the vat into the chamber, a compression ram in said chamber and operable between a retracted position in which said inlet to the chamber is open and an advanced position in which the ram is interposed between said inlet and the space in the chamber between said end wall and ram, and an outlet at the bottom of the chamber through which the compressed contents of the chamber can pass by gravity while supported on both sides by the ram and the end wall in the chamber.

References Cited in the file of this patent

UNITED STATES PATENTS

| | | |
|---|---|---|
| 1,071,020 | Bartholomew | Aug. 26, 1913 |
| 2,774,140 | Nessler et al. | Dec. 18, 1956 |
| 2,925,269 | Hensgen et al. | Feb. 16, 1960 |